US008488423B2

(12) United States Patent
Igarashi et al.

(10) Patent No.: US 8,488,423 B2
(45) Date of Patent: Jul. 16, 2013

(54) SERVO CONTROL DEVICE, OPTICAL DISK DEVICE, AND DATA TRANSFER METHOD

(71) Applicant: Panasonic Corporation, Osaka (JP)

(72) Inventors: Masayoshi Igarashi, Osaka (JP); Makito Nakatsuka, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/649,727

(22) Filed: Oct. 11, 2012

(65) Prior Publication Data
US 2013/0033974 A1    Feb. 7, 2013

Related U.S. Application Data

(63) Continuation of application No. PCT/JP2011/002191, filed on Apr. 13, 2011.

(30) Foreign Application Priority Data

Apr. 13, 2010    (JP) ................. 2010-092122

(51) Int. Cl.
G11B 7/00    (2006.01)
(52) U.S. Cl.
USPC .............. 369/44.27; 369/47.28; 369/53.1
(58) Field of Classification Search
USPC .......... 369/44.28, 44.27, 44.34, 47.1, 124.07, 369/47.27, 53.1, 124.14
See application file for complete search history.

(56) References Cited

U.S. PATENT DOCUMENTS

| 5,974,015 A * | 10/1999 | Iizuka et al. ................. 386/201 |
| 7,532,419 B2 * | 5/2009 | Arai et al. ........................ 360/8 |
| 2002/0181349 A1 | 12/2002 | Yoshioka | |
| 2009/0027796 A1 * | 1/2009 | Nitta ............................. 360/31 |

FOREIGN PATENT DOCUMENTS

| JP | 08-137780 A | 5/1996 |
| JP | 2000-250753 A | 9/2000 |
| JP | 2002-358667 A | 12/2002 |
| JP | 2009-004011 A | 1/2009 |

OTHER PUBLICATIONS

International Search Report mailed Jul. 19, 2011 issued in corresponding International Application No. PCT/JP2011/002191.

* cited by examiner

Primary Examiner — Nabil Hindi
(74) Attorney, Agent, or Firm — McDermott Will & Emery LLP

(57) ABSTRACT

A servo control device includes: a phase compensator configured to generate a plurality of types of control values for controlling a driver based on a signal output from an optical pickup, and output the control values; and a transfer data generator configured to serially transfer the control values to the driver. The phase compensator sends, to the transfer data generator, a notification that the phase compensator has output a control value which needs to be sent with a reduced delay among the control values. In response to the notification, the transfer data generator determines whether or not the transfer data generator is transferring one of the control values, and if the transfer data generator is not transferring one of the control values, the transfer data generator starts transferring a control value associated with the notification among the control values.

17 Claims, 6 Drawing Sheets

| | | 1ch | 2ch | 3ch | 4ch |
|---|---|---|---|---|---|
| 1Ts | 1st | Fo | Tk | Spm | Mode A |
| | 2nd | Fo | Tk | BexA | BexB |
| | 3rd | Fo | Tk | Tilt | Mode B |
| | 4th | Fo | Tk | TrsA | TrsB |

| | | 1ch | 2ch | 3ch | 4ch |
|---|---|---|---|---|---|
| 1Ts | 1st | Fo | Mode A | Tk | Mode B |
| | 2nd | Fo | Spm | BexA | BexB |
| | 3rd | Fo | Mode C | Tk | Mode D |
| | 4th | Fo | Tilt | TrsA | TrsB |

SERVO CONTROL DEVICE, OPTICAL DISK DEVICE, AND DATA TRANSFER METHOD

CROSS-REFERENCE TO RELATED APPLICATIONS

This is a continuation of PCT International Application PCT/JP2011/002191 filed on Apr. 13, 2011, which claims priority to Japanese Patent Application No. 2010-092122 filed on Apr. 13, 2010. The disclosures of these applications including the specifications, the drawings, and the claims are hereby incorporated by reference in their entirety.

BACKGROUND

The present disclosure relates to optical disk devices for recording data on disks and reproducing data from the disks, and more particularly to a servo control device which generates data for control in an optical disk device.

In recent years, optical disk devices have played an important role as key products for multimedia, and have become essential as peripheral equipment especially for personal computers. As such an optical disk device, drive devices for blu-ray discs (BDs) having much larger storage capacities than digital versatile discs (DVDs) have become widespread. With increases in speed of writing and reading of data and in storage capacity, such optical disk devices need to be downsized and manufactured at lower cost.

In an optical disk device, it is necessary to control components such as an actuator and a stepper motor for controlling, for example, the position of an optical pickup and a spindle motor for rotating the optical disk. As an example method for this control, a technique of controlling a driver based on a pulse width modulation (PWM) signal is known. To meet recent market demands such as reduction in size and cost, drivers are controlled using serial communication in order to perform servo control with a smaller number of signal lines (see, for example, Japanese Patent Publication No. 2009-004011).

SUMMARY

However, in an optical disk device described in Japanese Patent Publication No. 2009-004011, it is necessary to perform interrupt control in order to transfer data which needs to be sent with a reduced delay (i.e., data with high priority). Interrupt control produces invalid data which is less than one packet and cannot be used for control. While such data is on a data bus, the data bus is not effectively used.

Since the data bus is not effectively used in a certain period, it is necessary to transfer data at a speed higher than a transfer speed necessary for servo control, which leads to the necessity of an increase in frequency of a clock for transfer. For this reason, there are possibilities of complicated design and increased noise of a circuit board. In addition, performing interrupt control might complicate the configuration of a circuit for transmitting data, and thus, the cost might be increased.

It is therefore an object of the present disclosure to reduce a transfer speed on a data bus in performing driver control using serial communication.

In an aspect of the present disclosure, a servo control device for controlling a driver which drives an optical pickup and a motor includes: a phase compensator configured to generate a plurality of types of control values for controlling the driver based on a signal output from the optical pickup, and output the plurality of types of control values; and a transfer data generator configured to serially transfer the plurality of types of control values to the driver. The phase compensator sends, to the transfer data generator, a notification that the phase compensator has output a control value which needs to be sent with a reduced delay among the plurality of types of control values. In response to the notification, the transfer data generator determines whether or not the transfer data generator is transferring one of the plurality of types of control values. If the transfer data generator is not transferring one of the plurality of types of control values, the transfer data generator starts transferring a control value associated with the notification among the plurality of types of control values, whereas if the transfer data generator is transferring one of the plurality of types of control values, the transfer data generator starts transferring a control value associated with the notification among the plurality of types of control values after transferring the one of the plurality of types of control values.

In yet another aspect of the present disclosure, an optical disk device includes: an optical pickup; a motor configured to drive the optical pickup; a driver configured to drive the optical pickup and the motor; and a servo control section configured to control the driver. The servo control section includes a phase compensator configured to generate a plurality of types of control values for controlling the driver based on a signal output from the optical pickup, and output the plurality of types of control values, and a transfer data generator configured to serially transfer the plurality of types of control values to the driver. The phase compensator sends, to the transfer data generator, a notification that the phase compensator has output a control value which needs to be sent with a reduced delay among the plurality of types of control values. In response to the notification, the transfer data generator determines whether or not the transfer data generator is transferring one of the plurality of types of control values. If the transfer data generator is not transferring one of the plurality of types of control values, the transfer data generator starts transferring a control value associated with the notification among the plurality of types of control values, whereas if the transfer data generator is transferring one of the plurality of types of control values, the transfer data generator starts transferring a control value associated with the notification among the plurality of types of control values after transferring the one of the plurality of types of control values.

In still another aspect of the present disclosure, in a data transfer method for serially transferring a plurality of types of control values, a scheduler serially transfers the plurality of types of control values according to a data transfer order scheduled such that a control value with high priority is more frequently sent than a control value with low priority among the plurality of types of control values.

According to the present disclosure, since no interrupt control is performed, a data bus can be effectively used, and a transfer speed on the data bus can be reduced. As a result, a circuit can be easily designed, and power consumption can be reduced.

BRIEF DESCRIPTION OF THE DRAWINGS

FIG. 7 is a table showing another example of a transfer schedule of control values from the transfer data generator illustrated in FIG. 2 to the driver IC illustrated in FIG. 1.

DETAILED DESCRIPTION

Figure 1:
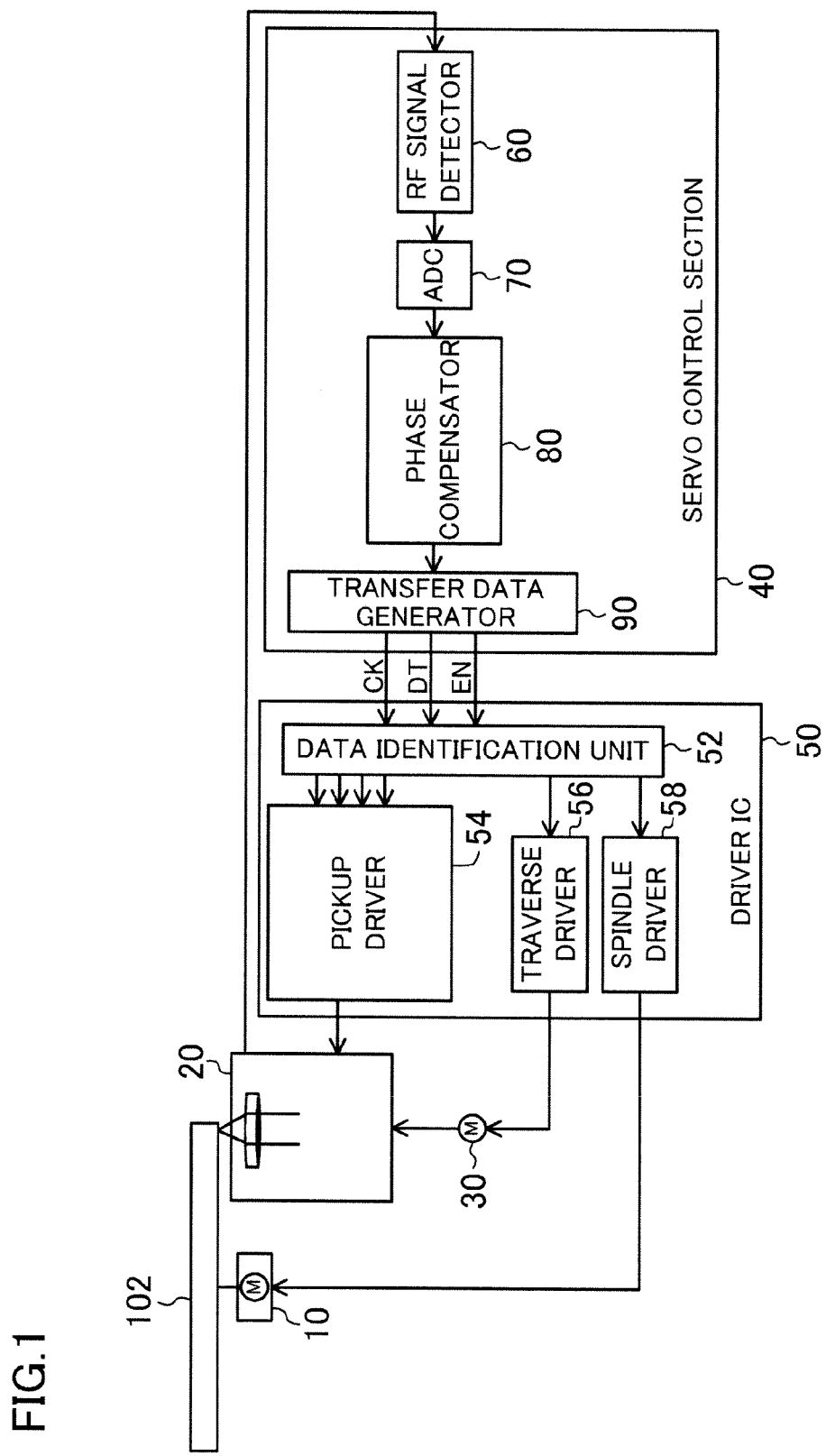
FIG. 1 is a block diagram illustrating an example of a configuration of an optical disk device according to an embodiment of the present disclosure.

An embodiment of the present disclosure will be described hereinafter with reference to the drawings. In the drawings, like reference characters are used to designate identical or equivalent elements.

FIG. 1 is a block diagram illustrating an example of a configuration of an optical disk device according to an embodiment of the present disclosure. The optical disk device illustrated in FIG. 1 includes a spindle motor 10, an optical pickup 20, a traverse motor 30, a servo control section 40, and a driver integrated circuit (driver IC) 50. The optical disk device illustrated in FIG. 1 records data on an optical disk 102 and reproduces data recorded on the optical disk 102, using a laser beam.

The spindle motor 10 rotates the optical disk 102. The optical disk 102 is a DVD or a BD, for example. The optical pickup 20 includes an objective lens for focusing a light beam on a recording surface of the optical disk 102, an actuator for moving the objective lens in a focusing direction and a tracking direction, a beam expander for correcting spherical aberration of the lens, and an optical/detection system. The optical/detection system includes a light emission unit for outputting a light beam, various prisms, a detector for detecting a signal, and an I/V amplifier, for example. The light emission unit is, for example, a semiconductor laser which outputs a laser beam. The optical pickup 20 converts light reflected on the optical disk 102 into a signal, and outputs the signal. The traverse motor 30 drives the optical pickup 20, and performs tracking in a range which the actuator of the optical pickup 20 cannot cope with and operation (seek operation) of widely moving among tracks.

The servo control section 40 includes an RF signal detector 60, an analog to digital converter (ADC) 70, a phase compensator 80, and a transfer data generator 90. The servo control section 40 controls a driver IC 50 to control the spindle motor 10, the actuator for driving the optical pickup 20, and the traverse motor 30. The servo control section 40 generates control values for this control. The phase compensator 80 is constituted by, for example, a digital signal processor (DSP). The servo control section 40 is implemented as a single large-scale integration (LSI) device, for example.

The driver IC 50 drives the actuator of the optical pickup 20, a motor for the beam expander, the spindle motor 10, and the traverse motor 30, according to the control values output from the servo control section 40. The driver IC 50 includes a data identification unit 52, a pickup driver 54, a traverse driver 56, and a spindle driver 58.

The RF signal detector 60 generates an analog RF signal (a servo signal) based on a signal output from the optical pickup 20. The ADC 70 performs A/D conversion on the analog RF signal generated by the RF signal detector 60, and outputs the obtained digital servo signal to the phase compensator 80.

The phase compensator 80 generates control values for controlling the drivers of the driver IC 50, i.e., control values for controlling the actuator of the optical pickup 20, the spindle motor 10, and the traverse motor 30, based on the digital servo signal, and outputs the control values to the transfer data generator 90. The control values generated by the phase compensator 80 are, for example, a focus control value Fo, a tracking control value Tk, a tilt control value Tilt, beam expander control values BexA and BexB, traverse control values TrsA and TrsB, a spindle control value Spm, and mode control values ModeA and ModeB. The focus control value Fo is a control value for focus control of the optical pickup 20. The tracking control value Tk is a control value for tracking control of the optical pickup 20.

The transfer data generator 90 outputs a clock CK, an enable signal EN, and a data signal DT to the driver IC 50. The transfer data generator 90 serially transfers the control values generated by the phase compensator 80 to the driver IC 50 using the data signal DT. The clock CK is used for data recovery in the driver IC 50 and operation of the driver IC 50. The enable signal EN indicates whether the data signal DT is valid or not.

The data signal DT is a signal for serially transferring, on a serial data bus, the control values generated by the phase compensator 80 for performing servo control such as focus control and tracking control. Each of the control values is transferred as a packet. The packet has a CH specification part and an instruction part. The instruction part has a control value generated by the phase compensator 80. The CH specification part has a value specifying which servo control is associated with the instruction part.

Figure 2:
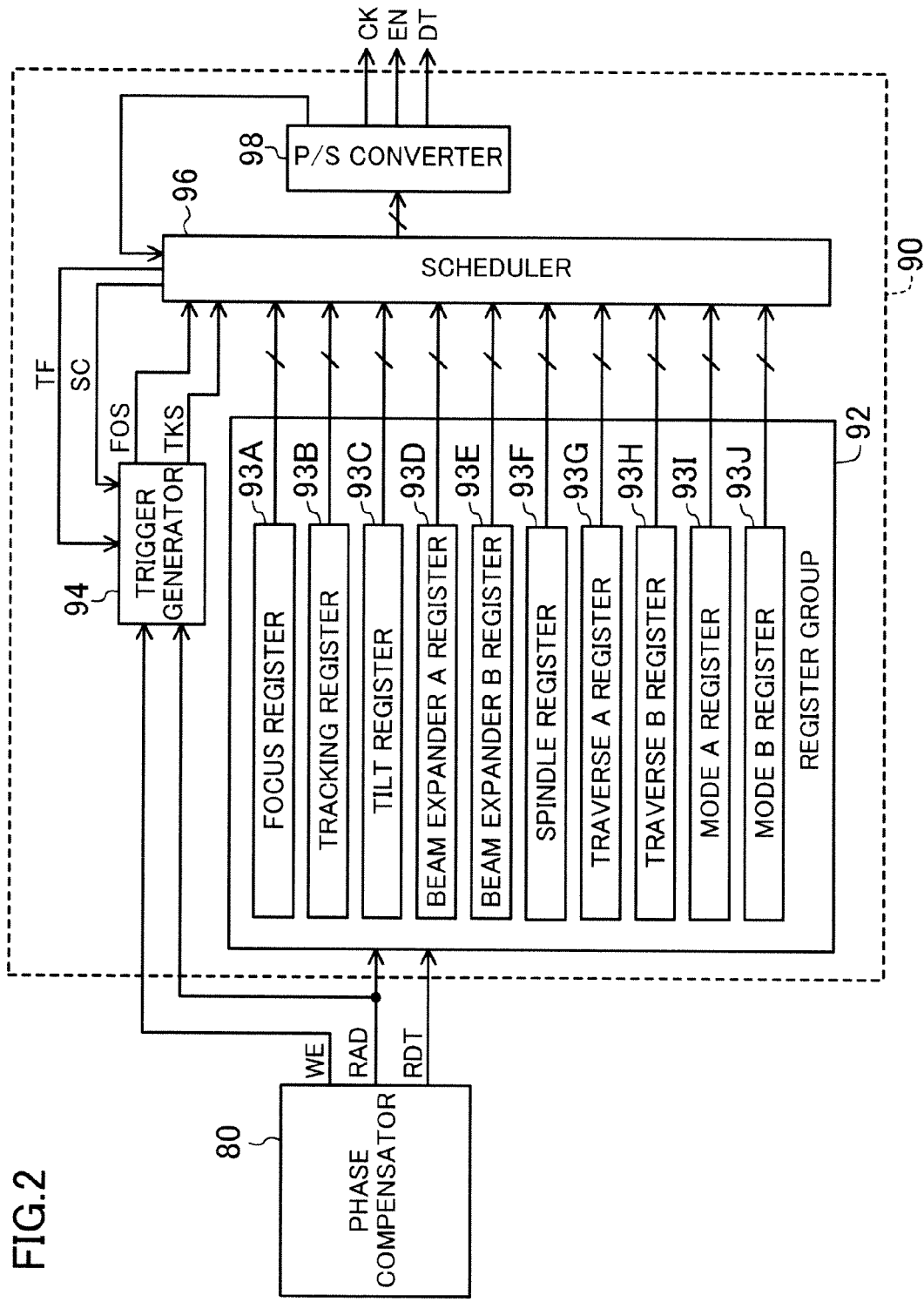
FIG. 2 is a block diagram illustrating an example of a configuration of a transfer data generator illustrated in FIG. 1.

FIG. 2 is a block diagram illustrating an example of a configuration of the transfer data generator 90 illustrated in FIG. 1. The transfer data generator 90 includes a register group 92, a trigger generator 94, a scheduler 96, and a P/S converter 98. The register group 92 includes a focus register 93A, a tracking register 93B, a tilt register 93C, a beam expander A register 93D, a beam expander B register 93E, a spindle register 93F, a traverse A register 93G, a traverse B register 93H, a mode A register 93I, and a mode B register 93J.

The phase compensator 80 generates and outputs control values to the register group 92 using a signal RDT. According to the type of each of the control values, the phase compensator 80 outputs an address RAD indicating which register the control value should be stored, to the register group 92. Each control value generated by the phase compensator 80 is stored in an associated one of the registers in the register group 92. The phase compensator 80 notifies the trigger generator 94 that the phase compensator 80 has output a control value which needs to be sent with a reduced delay among the control values, using a write enable signal WE and the address RAD. The control value which needs to be sent with a reduced delay is, for example, a focus control value and a tracking control value. These control values are data with high priority, and thus, need to be frequently sent. The other control values are data with lower priority than the focus control value and the tracking control value.

When the trigger generator 94 receives the notification from the phase compensator 80, the transfer data generator 90 starts transferring a control value associated with this notification, i.e., a control value associated with the address RAD while the transfer data generator 90 does not transfer the other control values. This processing will be specifically described below.

In response to the notification from the phase compensator 80, the trigger generator 94 generates a transfer start trigger associated with this notification based on the address RAD, and outputs the transfer start trigger to the scheduler 96. Specifically, the transfer start trigger is a focus trigger FOS or a tracking trigger TKS. It should be noted that if the trigger generator 94 receives a notification from the phase compensator 80 while a packet transfer flag TF is on (e.g., at a high logic level), the trigger generator 94 generates a trigger associated with the received notification after the packet transfer flag TF turns off (e.g., comes to be at a low logic level).

In response to the transfer start trigger, the scheduler 96 turns on the packet transfer flag TF, reads a control value associated with the received transfer start trigger from the register group 92, and outputs this control value to the P/S converter 98. The scheduler 96 reads a control value from the register group 92 and outputs this control value to the P/S converter 98, based on a predetermined schedule. After completion of output, the scheduler 96 turns off the packet transfer flag TF.

The P/S converter 98 converts parallel data output from the scheduler 96 into serial data, and transfers the serial data to the driver IC 50 using a data signal DT. The P/S converter 98 also outputs a clock CK and an enable signal EN.

The data identification unit 52 of the driver IC 50 divides a packet transferred using the data signal DT into a CH specification part and an instruction part. Based on data of the CH specification part, the data identification unit 52 determines which servo control is associated with data of the instruction part, and outputs the data of the instruction part to one of the pickup driver 54, the traverse driver 56, or the spindle driver 58 associated with the determination result. The pickup driver 54 drives the actuator of the optical pickup 20 in a focusing direction, a tracking direction, a tilt direction, and a spherical aberration correction direction, based on a focus control value Fo, a tracking control value Tk, a tilt control value Tilt, beam expander control values BexA and BexB output from the data identification unit 52.

The traverse driver 56 drives the traverse motor 30 based on traverse control values TrsA and TrsB output from the data identification unit 52. The spindle driver 58 drives the spindle motor 10 based on a spindle control value Spm output from the data identification unit 52. The mode control values ModeA and ModeB generated by the phase compensator 80 are used for setting on the driver IC 50.

Figure 3:
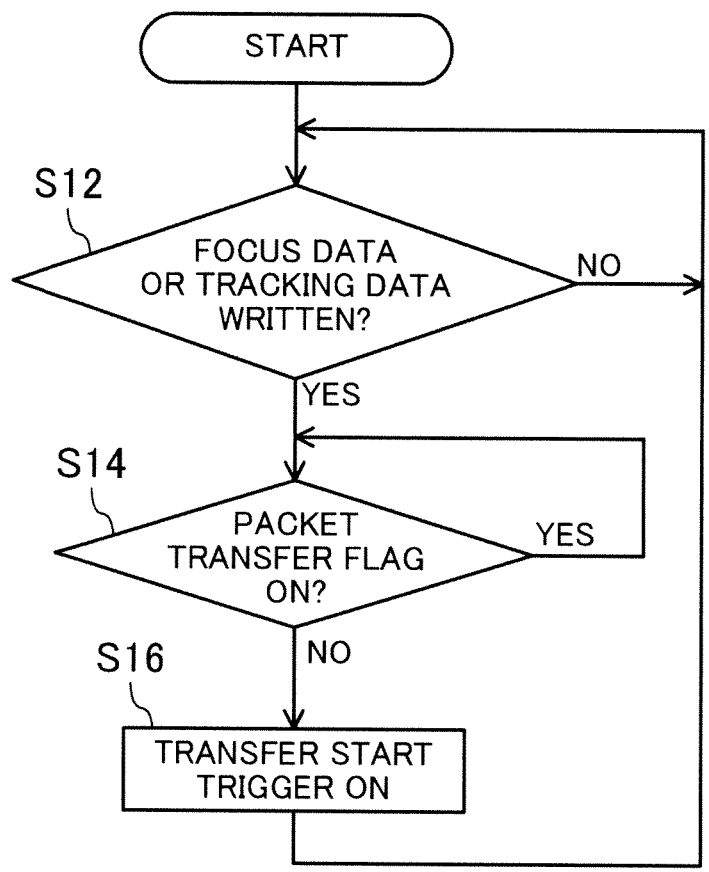
FIG. 3 is a flowchart showing an example of a flow of processing in a trigger generator illustrated in FIG. 2.
Figure 4:
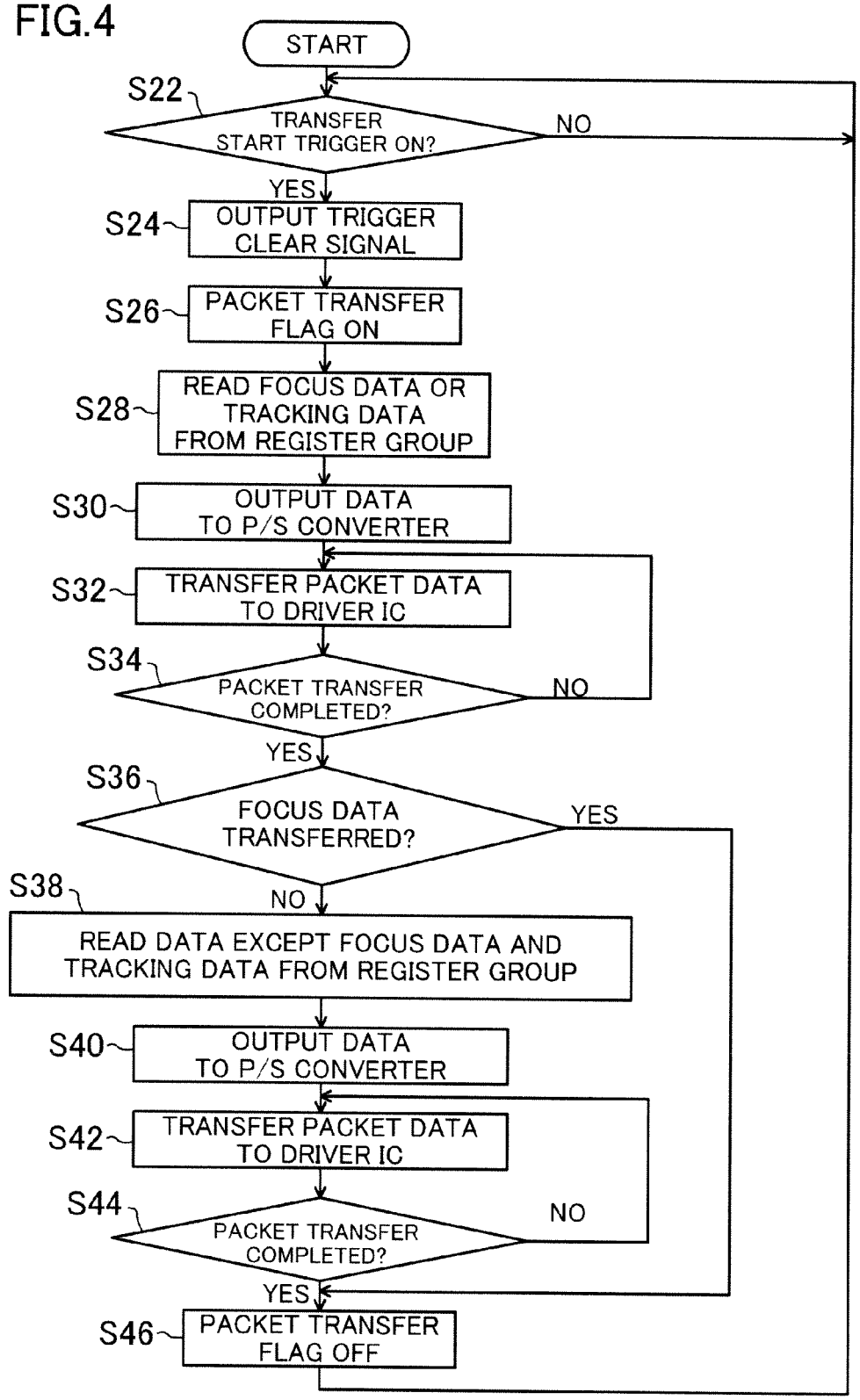
FIG. 4 is a flowchart showing an example of a flow of processing in a scheduler and a P/S converter illustrated in FIG. 2.
Figures 5, 6:
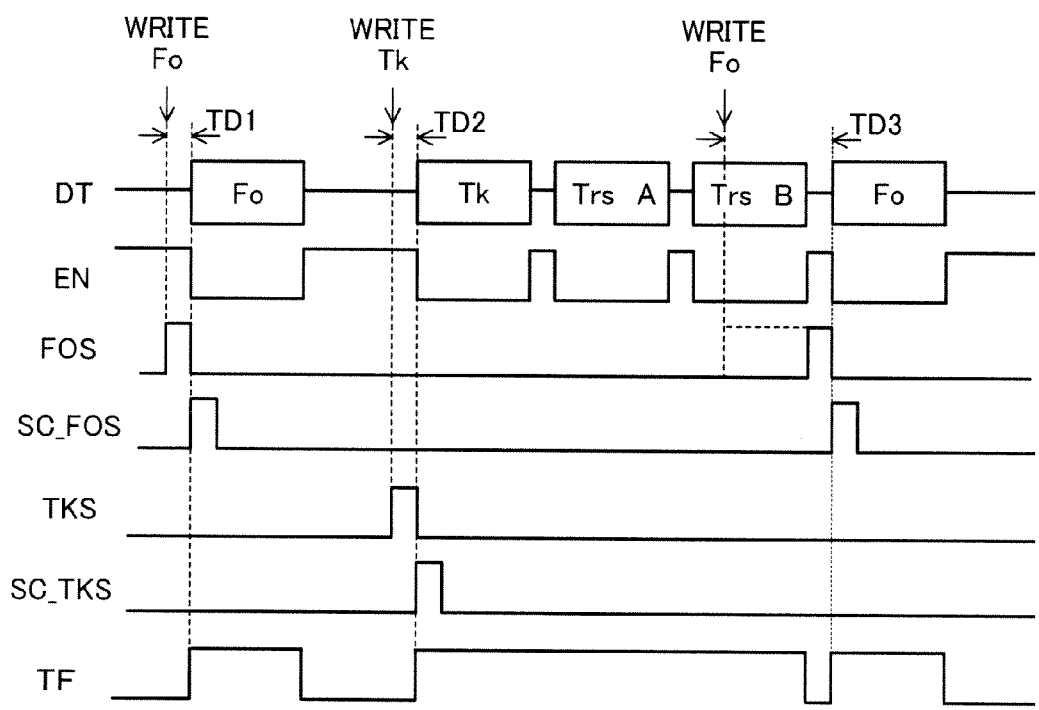
FIG. 5 is a table showing an example of a transfer schedule of control values from a transfer data generator illustrated in FIG. 2 to a driver IC illustrated in FIG. 1.
FIG. 6 is a timing chart showing an example of signals in the transfer data generator illustrated in FIG. 2.

FIG. 3 is a flowchart showing an example of a flow of processing in the trigger generator 94 illustrated in FIG. 2. FIG. 4 is a flowchart showing an example of a flow of processing in the scheduler 96 and the P/S converter 98 illustrated in FIG. 2. FIG. 5 is a table showing an example of a transfer schedule of control values from the transfer data generator 90 illustrated in FIG. 2 to the driver IC 50 illustrated in FIG. 1.

The schedule shown in FIG. 5 is determined beforehand. In this schedule. control values are transferred in the order from 1 ch to 4 ch in the first row, 1 ch to 4 ch in the second row, 1 ch to 4 ch in the third row, and then 1 ch to 4 ch in the fourth row. After 4 ch in the fourth row, the control value of 1 ch in the first row is transferred. Reference character Ts denotes the time of one cycle in control of the optical disk device illustrated in FIG. 1.

In the case of FIG. 5, a focus control value Fo and a tracking control value Tk as control values which need to be transferred with reduced delays are transferred, and then other two control values are transferred. This process is repeated. The focus control value Fo and the tracking control value Tk are also control values which need to be frequently sent.

Operation of the optical disk device illustrated in FIG. 1 in the case of transferring control values according to the schedule of FIG. 5 will now be described as an example. The RF signal detector 60 generates an analog RF signal from an output of the optical pickup 20. The ADC 70 performs A/D conversion on this analog RF signal, and outputs a generated digital servo signal to the phase compensator 80. The phase compensator 80 generates a control value based on the digital servo signal. The phase compensator 80 outputs, together with the generated control value, an address RAD indicating a register in which this control value is to be stored, to the transfer data generator 90. Each of the registers 93A-93J in the register group 92 stores an associated one of the latest control values generated by the phase compensator 80.

In block S12 shown in FIG. 3, the trigger generator 94 determines whether or not a focus control value Fo or a tracking control value Tk was output and written based on the notification from the phase compensator 80. If the focus control value Fo or the tracking control value Tk was output and written, the process proceeds to block S14. Otherwise, the process returns to block S 12.

In block S14, the trigger generator 94 determines whether a packet transfer flag TF is on or not. If the packet transfer flag TF is on, the process returns to block S14. If the packet transfer flag TF is off, the process proceeds to block S16. In block S16, if the trigger generator 94 determines that a focus control value was written, the trigger generator 94 generates a focus trigger FOS (i.e., turns on the focus trigger FOS). If the trigger generator 94 determines that a tracking control value was written, the trigger generator 94 generates a tracking trigger TKS (i.e., turns on the tracking trigger TKS). Thereafter, the process returns to block S 12.

In block S22 shown in FIG. 4, the scheduler 96 determines whether the transfer start trigger is on or not, i.e., determines whether the focus trigger FOS or the tracking trigger TKS is on or not. If any one of the triggers is on, the process proceeds to block S24. If both of the triggers are off, the process returns to block S22, and the process is suspended until a focus control value Fo or a tracking control value Tk is written.

If the focus trigger FOS is on, the process transitions to a focus packet transfer sequence. If the tracking trigger TKS is on, the process transitions to a tracking packet transfer sequence. The focus packet transfer sequence is the operation of transferring a packet of a focus control value Fo to the driver IC 50. In this sequence, only the focus control value Fo may be transferred, or alternatively, after transfer of the focus control value Fo, a control value which is neither a focus control value Fo nor a tracking control value Tk may be transferred.

The tracking packet transfer sequence is the operation of transferring a packet of a tracking control value Tk to the driver IC 50. In this sequence, only the tracking control value Tk may be transferred, or alternatively, after transfer of the tracking control value Tk, a control value which is neither a focus control value Fo nor a tracking control value Tk may be transferred.

Specifically, the following process is performed. In block S24, the scheduler 96 recognizes the type of a trigger which is on, generates a trigger clear signal SC which clears this trigger, and outputs the trigger clear signal SC to the trigger generator 94. The trigger generator 94 turns off a trigger indicated by the trigger clear signal SC. In block S26, the scheduler 96 turns on the packet transfer flag TF.

In block S28, the scheduler 96 reads a control value (a focus control value or a tracking control value) associated with the trigger which has been determined to be on. from the register group 92. In block S30, the scheduler 96 outputs the control value which has been read from the register group 92 to the P/S converter 98.

In block S32, the P/S converter 98 converts parallel data received from the scheduler 96 into serial data, and outputs the serial data as a packet with an enable signal EN to the driver IC 50. In block S34, the scheduler 96 determines whether packet transfer is completed or not, based on the notification from the P/S converter 98. If the packet transfer is completed, the process proceeds to block S36. If the packet transfer is not completed, the process returns to block S32. In block S36, the scheduler 96 determines whether a focus control value has been transferred or not. If the focus control value has been transferred, the process proceeds to block S46. Otherwise, the process proceeds to block S38.

Block S38 is performed after transfer of the tracking control value Tk has been completed. In block S38, the scheduler 96 reads two control values each of which is neither a focus control value Fo nor a tracking control value Tk from the register group 92 according to the transfer order shown in FIG. 5. In block S40, the scheduler 96 outputs the control values which have been read from the register group 92 to the P/S converter 98. In block S42, the P/S converter 98 converts parallel data received from the scheduler 96 into serial data, and outputs the data as a packet with an enable signal EN to the driver IC 50.

In the case of FIG. 5, in block S42, two control values except a focus control value Fo and a tracking control value Tk are successively transferred. For example, as the traverse motor 30, a stepping motor with two-phase excitation is employed. In this motor, rotational position of the motor is determined based on two signals. Accordingly, to control the motor, a pair of two control values, i.e., traverse control values TrsA and TrsB for respectively controlling the phases of the two signals needs to be used. The two control values to be used as such a pair are preferably transferred at timings which are as close as possible to each other. Thus, the scheduler 96 successively transfers the traverse control values TrsA and TrsB. The same holds true for a case where three or more control values need to be used as a set.

In block S44, the scheduler 96 determines whether packet transfer of the two control values read out in block S38 is completed or not based on the notification from the P/S converter 98. If the packet transfer is completed, the process proceeds to block S46. If the packet transfer is not completed, the process returns to block S42. In block S46, the scheduler 96 turns off the packet transfer flag TF. Thereafter, the process returns to block S22.

After the packet transfer flag TF has been turned on in block S26, the blocks shown in FIG. 3 cannot proceed from block S14. However, if the packet transfer flag TF is turned off in block S46, it is possible to turn on the transfer start trigger in block S16.

The data identification unit 52 of the driver IC 50 separates a CH specification part and an instruction part from each other in the received packet, and based on the value of the CH specification part, outputs the value of the instruction part to the pickup driver 54, the traverse driver 56, and the spindle driver 58. As described above, the pickup driver 54, the traverse driver 56, and the spindle driver 58 control systems respectively associated thereto, based on the values received from the data identification unit 52.

FIG. 6 is a timing chart showing an example of signals in the transfer data generator 90 illustrated in FIG. 2. FIG. 6 shows a case where control values in the fourth row in FIG. 5 are transferred. The trigger clear signal SC in FIG. 2 includes trigger clear signals SC_FOS and SC_TKS. When a focus control value Fo is written from the phase compensator 80, the trigger generator 94 turns on a focus trigger FOS. The scheduler 96 recognizes that the focus trigger FOS is on, and turns on the trigger clear signal SC_FOS which clears this trigger, and outputs the trigger clear signal SC_FOS. The trigger generator 94 turns off the focus trigger FOS associated with the trigger clear signal SC_FOS, and transfers a packet of the focus control value Fo to the driver IC 50.

Thereafter, when a tracking control value Tk is written from the phase compensator 80, the trigger generator 94 turns on the tracking trigger TKS. The scheduler 96 recognizes that the tracking trigger TKS is on, turns on the trigger clear signal SC_TKS which clears this trigger, and outputs the trigger clear signal SC_TKS. The trigger generator 94 turns off the tracking trigger TKS associated with the trigger clear signal SC_TKS, and transfers a packet of the tracking control value Tk to the driver IC 50. Then, a packet of a traverse control value TrsA and packet of a traverse control value TrsB are successively transferred.

When being notified that the phase compensator 80 has output the focus control value Fo or the tracking control value Tk while the P/S converter 98 was transferring data, the trigger generator 94 generates a trigger associated with the received notification after the data transfer. In the case of FIG. 6, the focus control value Fo is written from the phase compensator 80 while the traverse control value TrsB is being transferred. Thus, after the transfer of the traverse control value TrsB, the trigger generator 94 generates a focus trigger FOS. Times TD1, TD2, and TD3 denote processing times in the transfer data generator 90. As described above, these processing times are not constant.

As shown in FIG. 6, in many cases, control values are output from the phase compensator 80 while packet data is being transferred. For example, while a packet of a tracking control value Tk is being transferred, a new focus control value Fo can be output from the phase compensator 80 in some cases. Even in such cases, as shown in the schedule in FIG. 5, for example, after all the data packets to be transferred before the focus control value Fo have been transferred, a new trigger is generated.

FIG. 7 is a table showing another example of a transfer schedule of control values from the transfer data generator 90 shown in FIG. 2 to the driver IC 50 illustrated in FIG. 1. The transfer schedule is not limited to the example shown in FIG. 5, and may be, for example, the schedule shown in FIG. 7. Mode control values ModeC and ModeD are used for setting the driver IC 50, for example.

The order of transfer can be optimized by using the order of operations of the phase compensator 80. Specifically, if operation for focus control is performed in a shorter period (i.e., performed more frequently) than operation for tracking control, a focus control value is transferred four times and a tracking control value is transferred twice in a period Ts, for example, as shown in FIG. 7. The focus control value is transferred at every fourth value and the tracking control value is transferred at every eighth value so that control values of the same type are transferred substantially at regular intervals. A focus control value and a tracking control value do not need to be transferred successively, and other control values may be transferred between the focus control value and the tracking control value.

As described above, in this embodiment, data for servo drive output from the phase compensator 80 is converted into serial data, and the serial data is transferred on a single signal line. Accordingly, servo control such as pickup can be implemented with a small number of signal lines, leading to reduced package size of LSI including the servo control section 40 or of the driver IC 50. As a result, the area of a board on which a circuit for an optical disk device is mounted can be reduced, and the size of the optical disk device can also be reduced.

In addition, since no interrupt transfer is performed, it is sufficient to transfer values at a transfer speed sufficient for servo control, and thus, the transfer speed on a data bus can be reduced. Accordingly, the frequency of a clock for transfer can be made relatively low, and a circuit board can be easily designed. The absence of a circuit for interrupt control can simplify the configuration of a circuit for transmitting data, resulting in cost reduction of an optical disk device.

As described above, according to the present disclosure, the transfer speed on a data bus can be reduced. Thus, the present disclosure is useful for servo control devices and optical disk devices, for example.

What is claimed is:

1. A servo control device for controlling a driver which drives an optical pickup and a motor, the servo control device comprising:
    a phase compensator configured to generate a plurality of types of control values for controlling the driver based on a signal output from the optical pickup, and output the plurality of types of control values; and
    a transfer data generator configured to serially transfer the plurality of types of control values to the driver, wherein:
    the phase compensator sends, to the transfer data generator, a notification that the phase compensator has output a control value which needs to be sent with a reduced delay among the plurality of types of control values,
    in response to the notification, the transfer data generator determines whether or not the transfer data generator is transferring any of the plurality of types of control values, and
    if the transfer data generator is transferring none of the plurality of types of control values, the transfer data generator starts transferring a control value associated with the notification among the plurality of types of control values, whereas if the transfer data generator is transferring one of the plurality of types of control values, the transfer data generator starts transferring a control value associated with the notification among the plurality of types of control values after transferring the one of the plurality of types of control values.

2. The servo control device of claim 1, wherein
the control value which needs to be sent with a reduced delay is at least one of a control value for focus control of the optical pickup and a control value for tracking control of the optical pickup.

3. The servo control device of claim 1, wherein
the transfer data generator includes:
    a register group configured to store the plurality of types of control values;
    a trigger generator configured to receive the notification and generate a trigger associated with the notification;
    a scheduler configured to turn on a transfer flag in response to the trigger, read a control value associated with the trigger among the plurality of types of control values from the register group, output the control value which has been read from the register group, and after outputting the control value, turn off the transfer flag; and
    a converter configured to convert an output from the scheduler into serial data and transfer the serial data, and if the trigger generator receives the notification while the transfer flag is on, the trigger generator generates a trigger associated with the notification after the transfer flag has been turned off.

4. The servo control device of claim 1, wherein
if a plurality of control values out of the plurality of types of control values need to be sent as a set for control, the transfer data generator successively transfers the plurality of control values which need to be sent as a set for control.

5. The servo control device of claim 1, wherein
the transfer data generator transfers the plurality of types of control values in an order defined in a predetermined schedule.

6. The servo control device of claim 5, wherein
the transfer data generator transfers the control value which needs to be sent with a reduced delay and the other control values successively.

7. An optical disk device, comprising:
    an optical pickup;
    a motor configured to drive the optical pickup;
    a driver configured to drive the optical pickup and the motor; and
    a servo control section configured to control the driver, wherein:
    the servo control section includes:
        a phase compensator configured to generate a plurality of types of control values for controlling the driver based on a signal output from the optical pickup, and output the plurality of types of control values; and
        a transfer data generator configured to serially transfer the plurality of types of control values to the driver,
    the phase compensator sends, to the transfer data generator, a notification that the phase compensator has output a control value which needs to be sent with a reduced delay among the plurality of types of control values,
    in response to the notification, the transfer data generator determines whether or not the transfer data generator is transferring any of the plurality of types of control values, and
    if the transfer data generator is transferring none of the plurality of types of control values, the transfer data generator starts transferring a control value associated with the notification among the plurality of types of control values, whereas if the transfer data generator is transferring one of the plurality of types of control values, the transfer data generator starts transferring a control value associated with the notification among the plurality of types of control values after transferring the one of the plurality of types of control values.

8. A data transfer method for serially transferring a plurality of types of control values, comprising steps of:
    starting transfer, by a controller, of a control value with highest priority among the plurality of types of control value, if none of the plurality of types of control values is transferred; and
    starting transfer, by the controller, of a control value with highest priority among the plurality of types of control value after transferring the one of the plurality of types of control values, if one of the plurality of types of control values is transferred.

9. The data transfer method of claim 8, wherein
in response to a transfer start trigger for the control value with high priority, the transfer of the control value with highest priority is started.

10. The data transfer method of claim 8, wherein
the plurality of types of control values are serially transferred according to a data transfer order scheduled such that a control value with higher priority is more frequently sent than a control value with lower priority among the plurality of types of control values.

11. The data transfer method of claim 8, wherein
the control value with highest priority is at least one of a control value for focus control of an optical pickup and a control value for tracking control of the optical pickup.

12. The data transfer method of claim 8, wherein
if a plurality of control values out of the plurality of types of control values need to be sent as a set for control, the plurality of control values are successively transferred as a set.

13. The optical disk device of claim 7, wherein
the control value which needs to be sent with a reduced delay is at least one of a control value for focus control of the optical pickup and a control value for tracking control of the optical pickup.

14. The optical disk device of claim 7, wherein:
the transfer data generator includes:
 a register group configured to store the plurality of types of control values;
 a trigger generator configured to receive the notification and to generate a trigger associated with the notification;
 a scheduler configured to turn on a transfer flag in response to the trigger, to read a control value associated with the trigger among the plurality of types of control values from the register group, to output the control value which has been read from the register group, and after outputting the control value, to turn off the transfer flag; and
 a converter configured to convert an output from the scheduler into serial data and transfer the serial data, and
if the trigger generator receives the notification while the transfer flag is on, the trigger generator generates a trigger associated with the notification after the transfer flag has been turned off.

15. The optical disk device of claim 7, wherein
if a plurality of control values out of the plurality of types of control values need to be sent as a set for control, the transfer data generator successively transfers the plurality of control values which need to be sent as a set for control.

16. The optical disk device of claim 7, wherein
the transfer data generator transfers the plurality of types of control values in an order defined in a predetermined schedule.

17. The optical disk device of claim 16, wherein
the transfer data generator transfers the control value which needs to be sent with a reduced delay and the other control values successively.

* * * * *